May 20, 1941. E. MÜLLER 2,242,366
APPARATUS FOR TESTING MAGNETIZABLE WORKPIECES FOR CRACKS
Filed Oct. 20, 1937
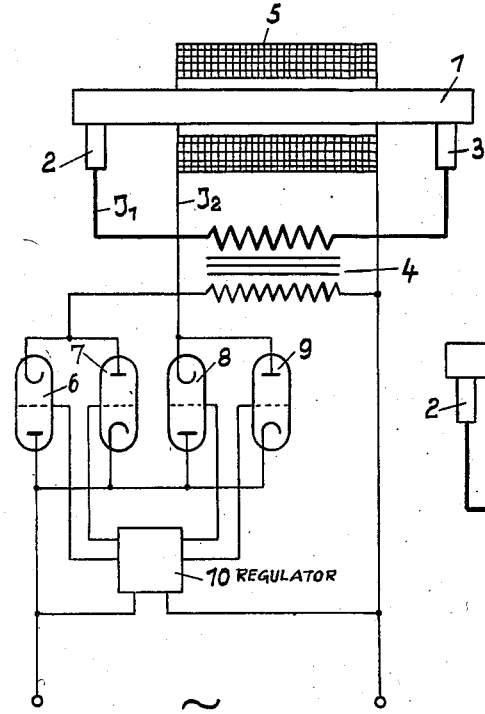
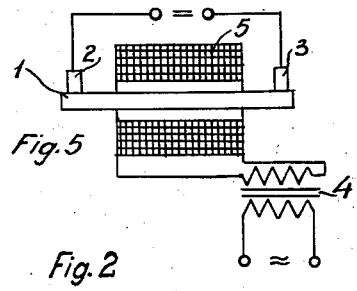
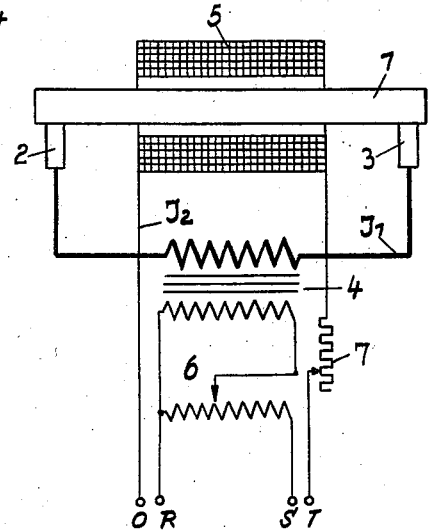
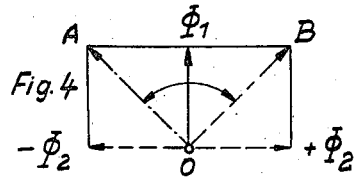
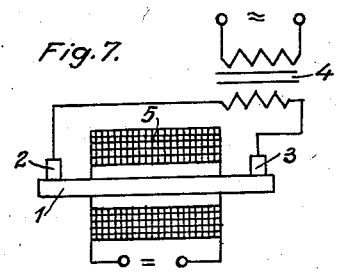
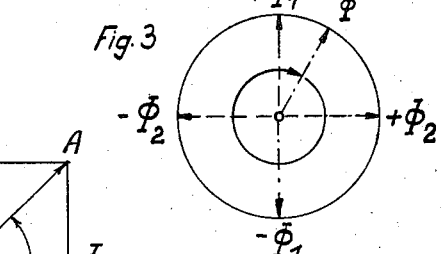
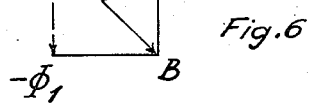
Ernst Müller
Inventor
by Knight
Attys.

UNITED STATES PATENT OFFICE 2,242,366

APPARATUS FOR TESTING MAGNETIZABLE WORKPIECES FOR CRACKS

Ernst Müller, Berlin-Spandau, Germany, assignor to Siemens & Halske, Aktiengesellschaft, Siemensstadt, near Berlin, Germany, a corporation of Germany Application October 20, 1937, Serial No. 169,937
In Germany December 22, 1936

7 Claims. (Cl. 175—183)

The present invention relates to an apparatus for testing magnetizable workpieces for cracks.

It is well known in the art to test magnetizable workpieces for cracks by magnetizing the workpiece and by rinsing it at the same time with a liquid containing iron filings. The iron particles adhere then to the cracks so that the position of the cracks may be recognized also after shutting off the oil rinsing and cutting out the magnetization. In this case, two different methods may be chiefly employed. Particularly in the case of long workpieces, it is preferable to magnetize the latter by using directly the workpiece to be tested as a conductor. In this manner, a circular magnetic field is created in the workpiece in the neighborhood of its surface; i. e., a magnetic field whose magnetic lines encircle, for instance, a body of revolution traversed by a current in the axial direction. A second method consists in magnetizing the workpiece in the longitudinal direction by means of an exciting winding traversed by an electric current.

However, these two methods have the drawback that cracks extending in the direction of the lines of force of the magnetic field cannot be made evident. It is true that when employing a circular field magnetization, longitudinal cracks may be recognized when testing a cylindrical shaft, but not transverse cracks which extend exactly perpendicularly to the axis. On the other hand, longitudinal cracks extending exactly in parallel relation to the axis cannot be detected by the longitudinal magnetization.

This drawback is avoided according to the invention by producing in the workpiece a magnetic field which changes its direction in rapid sequence by an angle of at least 90°. In this case, the frequency of oscillation or the speed of rotation must be of such a magnitude that the liquid cannot wash away the iron filings adhering to the cracks.

The invention may be carried out in different ways. Thus, for instance, the workpiece may alternately be inserted as a conductor in an electric circuit and on the other hand be magnetized in the direction of the flow of current by means of an exciting winding to be connected in a corresponding manner. If the change-over and, therefore, the inversion of the direction of the lines of force is effected in a sufficiently rapid manner, then the iron filings adhering to the cracks will not be washed away during the cleansing so that cracks extending in any direction may be recognized after cutting out the magnetization.

An oscillating magnetic field may be produced in the workpiece in a simpler manner by inserting the latter as a conductor in an electric circuit and by magnetizing it at the same time in the direction of the flow of current by means of an exciting winding. In this case, at least one of the components thus produced of the magnetic field must be an alternating field. For instance, an alternating current may be conducted through the workpiece and at the same time the exciting winding may be connected to a direct-current source or vice versa. A magnetic field is thus produced whose lines of force oscillate about the position determined by the direct-current magnetization. However, the total field may also be produced by two alternating-current components. In this case, a rotating field is obtained if care is taken to shift the phases of the exciting currents an angle of a sufficiently great value.

The drawing exemplifies the invention as follows:

Fig. 1 shows an arrangement for testing workpieces according to the invention.

Fig. 2 illustrates another embodiment.

Fig. 3 presents an explanatory diagram relating to the embodiment of Fig. 2.

Fig. 4 is explanatory and refers to a further way of embodying the invention.

Fig. 5 shows an arrangement corresponding to the way of operation explained by Fig. 4.

Fig. 6 presents an explanatory diagram, and

Fig. 7, a corresponding testing arrangement embodying still another modification of the invention.

In Fig. 1 is shown in diagrammatic form a device for carrying out the method according to the invention. In order to test a shaft 1, the latter is supported on bearings 2, 3 which serve as conductors for sending current longitudinally through the shaft and which are designed accordingly at their supporting points.

Instead of the bearings 2 and 3, clamping devices may be provided. The current is supplied by a transformer 4 whose primary winding is connected to an alternating-current supply circuit through grid-controlled tubes 6 and 7. Furthermore, an exciting coil 5 is provided which is also connected to the alternating-current supply circuit through grid-controlled tubes 8 and 9. The grids of the rectifiers connected in parallel relation in pairs and having opposite flow directions, are connected to a control and regulating device 10. By this arrangement it is possible to alternately cause an alternating current $J_1$ to flow longitudinally through the workpiece 1 during one or more cycles, thus producing therein a circular field and to cause an alternating current $J_2$ to energize the magnetization coil during one or more cycles, thereby producing a longitudinal field in the workpiece.

Another form of the invention is shown diagrammatically in Fig. 2. In this case, the transformer 4 is connected to the phases R and S of a three-phase supply circuit through a regulating device 6 and the exciting coil 5 is connected to the phase T and the neutral point O of the supply circuit through a regulating device 7.

The voltages R, S and T, O are 90° out of phase. Consequently, also the current $J_1$ in the secondary winding of the transformer 4 or the circular field $\Phi_1$ and the current $J_2$ in the exciting winding 5 or the longitudinal field $\Phi_2$ are 90° out of phase, provided that the currents or the fields and the voltages in both circuits producing the same be also 90° out of phase. In this case, elliptical and, when regulating in a corresponding manner, circular rotating fields are created on the surface of the workpiece.

Such a circular rotating field is graphically represented by the vector diagram in Fig. 3. Here, the plane of the drawing represents, so to say, the surface of the workpiece, the horizontal direction corresponding to the direction of the object axis or of the flow of current.

In the direction of this axis an alternating field $\pm\Phi_2$ is then brought about by the exciting winding 5 and perpendicularly thereto an alternating field $\pm\Phi_1$ owing to the magnetization by the current $J_1$. The two components are composed to a rotating field $\Phi$ which rotates with a speed corresponding to the frequency of the supply circuit. The regulating devices 6 and 7 serve to render the two field components $\Phi_1$ and $\Phi_2$ preferably equal in magnitude. Under given circumstances, special phase controlling means may also be employed in order to control the phase displacement of the field components. In this case, both currents may also be taken from a single phase supply circuit.

In Fig. 4 is shown a diagram which represents the composition of the field components $\Phi_1$ and $\Phi_2$, if the current $J_1$ flowing through the workpiece is a direct current, whereas the exciting winding 5 is connected to an alternating-current source. In this case, the magnetic field on the surface of the workpiece is composed of a circular direct-current field $\Phi_1$ about the axis and an alternating-current field $\pm\Phi_2$ in parallel relation to the axis. Consequently, the total field oscillates between the end positions indicated by the vectors OA and OB, the magnitude of the field being limited by the straight line AB. If $\Phi_1$ is equal to $\Phi_2$, an angle of oscillation of 90° results.

An arrangement for executing the method elucidated by Fig. 4 is illustrated in Fig. 5. The terminals 2 and 3 are connected with a direct current source, while the winding 5 simultaneously is connected through transformer 4 with an alternating current source, both magnetizing circuits operating simultaneously.

Fig. 6 shows a diagram in which the current $J_1$ is an alternating current which is, for instance, taken from a transformer 4, whereas the exciting winding 5 is supplied with a direct current, as shown in Fig. 7. A magnetic field is then produced which oscillates about the longitudinal axis. In this case, also an angle of oscillation of 90° results, if $\Phi_1$ is equal to $\Phi_2$.

What is claimed is:

1. In an arrangement for testing magnetizable workpieces for cracks by magnetizing the workpiece and rinsing it with a liquid containing iron filings, means for passing a current through the workpiece, said means having terminals for contacting the workpiece at points spaced apart in the longitudinal direction of the workpiece, a magnetization winding disposed to surround the workpiece, and circuit means for alternately operating said means and said magnetization winding in a rapid sequence to produce in the workpiece alternating magnet fields of substantially perpendicular directions relative to each other, in order to cause said material to simultaneously indicate cracks of any direction.

2. In an arrangement for testing magnetizable workpieces for cracks by magnetizing the workpiece and rinsing it with a liquid containing iron filings, means for passing a current through the workpiece, said means having terminals for contacting the workpiece at points spaced apart in the longitudinal direction of the workpiece for producing a circular magnetization, a magnetizing winding arranged so as to surround the workpiece in order to produce a lengthwise magnetization, a direct current source connected with said terminals, and an alternating current source operative simultaneously with said direct current source and connected with said winding to produce in said workpiece a resultant magnet field varying its direction by an angle of at least 90° to cause said iron filings to simultaneously indicate cracks of any direction, said alternating current source having a frequency sufficiently high to prevent said filings from being washed away by said liquid.

3. In an arrangement for testing magnetizable workpieces for cracks by magnetizing the workpiece and rinsing it with a liquid containing iron filings, contact means for passing an alternating current through the workpiece, a magnetization winding arranged to surround the workpiece, and alternating current supply means for simultaneously energizing said contact means and said winding with phase-different alternating currents of the same frequency so as to produce in the workpiece a resultant field of rapidly varying direction in order to cause said filings to continuously indicate cracks extending in any possible direction.

4. In an arrangement for testing magnetizable workpieces for cracks by magnetizing the workpiece and rinsing it with a liquid containing iron filings, contact means for passing current longitudinally through the workpiece, a magnetizing winding arranged to surround the workpiece, an energizing alternating current circuit connected with said contact means and said winding for simultaneously supplying said contact means and said winding with alternating current of the same frequency, and phase-shifting means in said circuit for displacing the phases of said currents relative to each other in order to produce in the workpiece a resultant field of rapidly and continuously varying direction for simultaneously indicating cracks of any possible direction.

5. In an arrangement for testing a workpiece for cracks and similar defects by magnetizing the workpiece and supplying finely divided magnetic material to its surface, in combination, magnetizing means for producing a circular magnet field in the workpiece, magnetizing means for producing a longitudinal field in said piece, a multiphase alternating current circuit having one of its phases connected with said first magnetizing means and another phase connected with said second means to energize said first and said second means simultaneously by phase-displaced currents in order to produce a resultant magnetic field of rapidly and continuously varying direction for simultaneously indicating cracks of any possible direction.

6. In an arrangement for testing magnetizable workpieces for cracks by magnetizing the workpiece and rinsing it with a liquid containing iron filings, contact means for passing current longitudinally through the workpiece, a magnetizing winding arranged to surround the workpiece, and a three-phase alternating current circuit having three supply leads and a neutral lead, two of said supply leads being connected with said contact means, and the third supply lead and said neutral lead being connected with said winding in order to produce a resultant magnetic field of rapidly and continuously varying direction for simultaneously indicating cracks of any possible direction.

7. In an arrangement for testing magnetizable workpieces for cracks by magnetizing the workpiece and rinsing it with a liquid containing iron fillings, a magnetizing winding arranged so as to surround the workpiece for producing in the workpiece a longitudinal magnetization, means for passing a current through the workpiece, said means having terminals for contacting the workpiece at points spaced apart in the longitudinal direction of the workpiece for producing in the workpiece a circular magnetization simultaneous with said longitudinal magnetization, and two current sources connected with said terminals and said winding respectively, said two current sources having different time characteristics so as to produce a resultant magnetization continuously changing its direction by an angle of at least 90°, at least one of said sources varying its current intensity with a frequency sufficiently high to prevent said filings from being washed away by said liquid, whereby the filings adhering to the workpiece simultaneously indicate cracks of any direction.

ERNST MÜLLER.